US006212775B1

(12) United States Patent
Sarver et al.

(10) Patent No.: US 6,212,775 B1
(45) **Date of Patent: *Apr. 10, 2001**

(54) METHOD AND APPARATUS FOR PULLING BUSHINGS AND BEARINGS

(75) Inventors: Garry A. Sarver, Belvidere; Wayne D. Decker, Geno, both of IL (US)

(73) Assignee: Fulcrum Tools, Inc., Loves Park, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,134

(22) Filed: Jun. 9, 1998

(51) Int. Cl.$^{7}$ .................................................... B23P 19/04

(52) U.S. Cl. .......................... 29/898.08; 29/256; 29/266; 29/426.5

(58) Field of Search ............................ 29/256, 258, 257, 29/263, 266, 426.5, 898.08

(56) References Cited

U.S. PATENT DOCUMENTS

| | | | | |
|---|---|---|---|---|
| 1,493,534 | * | 5/1924 | Hardin | 29/266 |
| 2,253,411 | * | 8/1941 | Thompson | 29/85 |
| 2,650,419 | * | 9/1953 | Barbisch | 29/266 |
| 4,207,664 | | 6/1980 | Zoula . | |
| 4,471,517 | | 9/1984 | Denmeade et al. . | |
| 4,473,933 | | 10/1984 | Renk . | |
| 4,502,197 | | 3/1985 | Harder . | |
| 4,514,890 | * | 5/1985 | Stewart | 29/256 |
| 4,771,528 | | 9/1988 | Stromberg . | |
| 4,868,965 | | 9/1989 | Drymon . | |
| 4,989,311 | | 2/1991 | Rosin . | |
| 5,226,208 | | 7/1993 | Gracey . | |
| 5,319,832 | * | 6/1994 | Clement | 29/266 |
| 5,349,736 | | 9/1994 | Rubino et al. . | |
| 5,613,288 | | 3/1997 | Lundsten . | |

* cited by examiner

*Primary Examiner*—S. Thomas Hughes
*Assistant Examiner*—Essama Omgba
(74) *Attorney, Agent, or Firm*—Leydig, Voit & Mayer, Ltd.

(57) ABSTRACT

A blind hole bushing puller and method, wherein the puller comprises: a rectangular cross block having a first end-portion and a second end portion, a pair of elongated leg screws, a circular bushing insert, and a bolt with a matching washer and a nut. Each of the end-portions of the cross block have a threaded leg hole formed therethrough, the cross block also has a centrally located unthreaded cross block hole. One of the leg screws passes through one of the threaded leg holes, and the other leg screw passes through the other threaded leg hole. The bushing insert has a centrally located unthreaded bushing insert hole and is sized to snugly fit about an inside diameter of the bushing. The bolt is sized to pass through the bushing insert hole and the cross block hole with a head of the bolt being positioned adjacent an upper portion of the bushing insert. The bolt head is sized slightly larger than the bushing insert hole and has a sufficient length so as to allow a lower portion of the bolt to extend beyond a lower end of the cross block hole. The bolt is securable to the cross block by the washer and the nut. Whereby when the bushing insert is securely attached within the bushing and the bolt is secured through the bushing insert and the cross block, the leg screws can be tightened in a direction wherein an upper portion of the leg screws comes into engagement with a housing portion supporting the bushing. The leg screws can then be further tightened in an alternating fashion thereby pulling and eventually removing the bushing from the hole.

17 Claims, 5 Drawing Sheets

FIG. 2
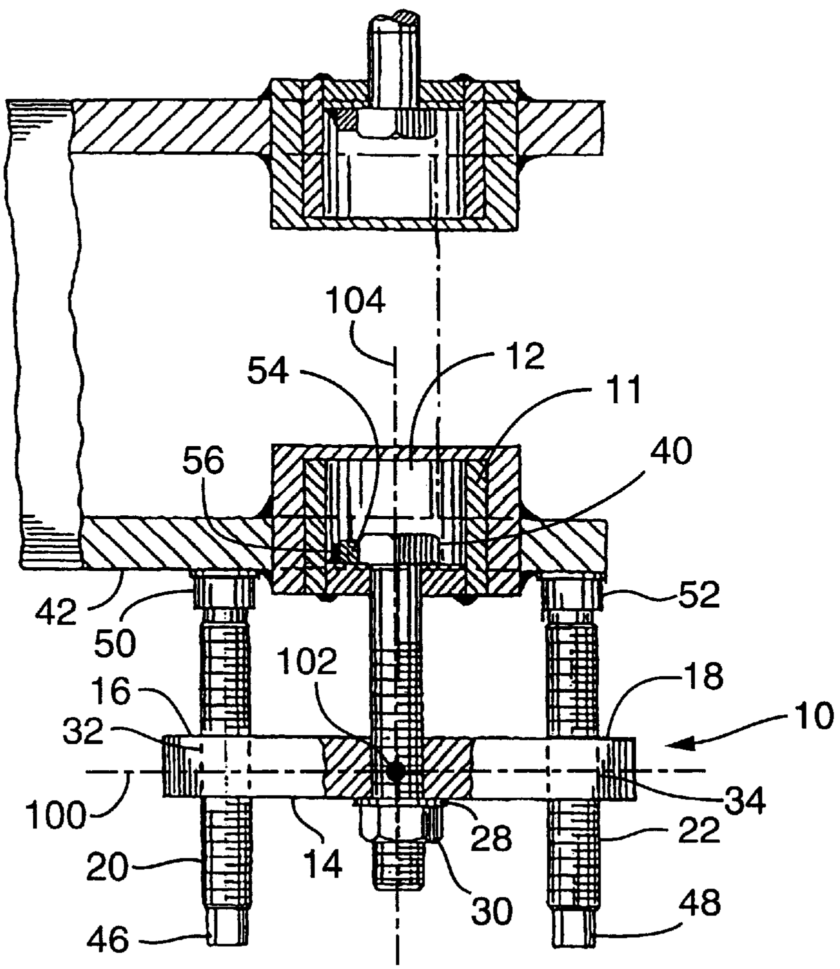
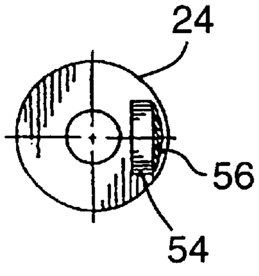
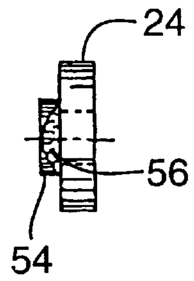
FIG. 3
FIG. 4

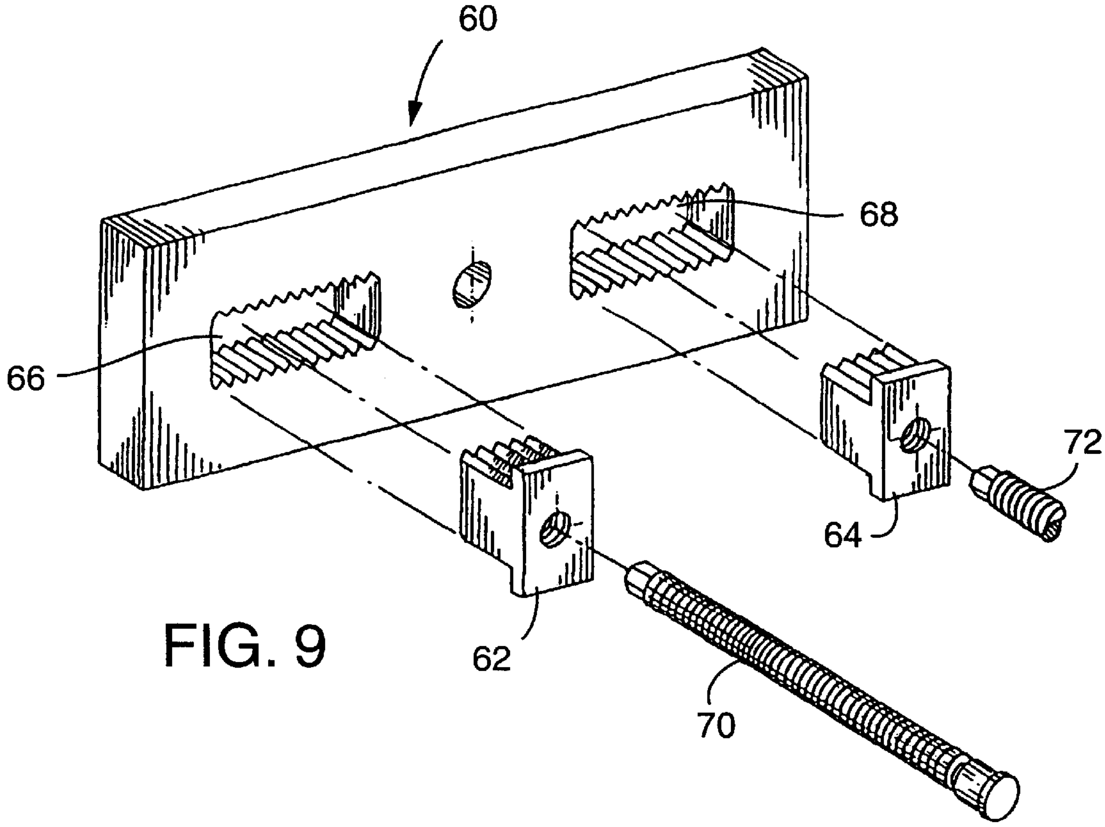
FIG. 9
FIG. 10
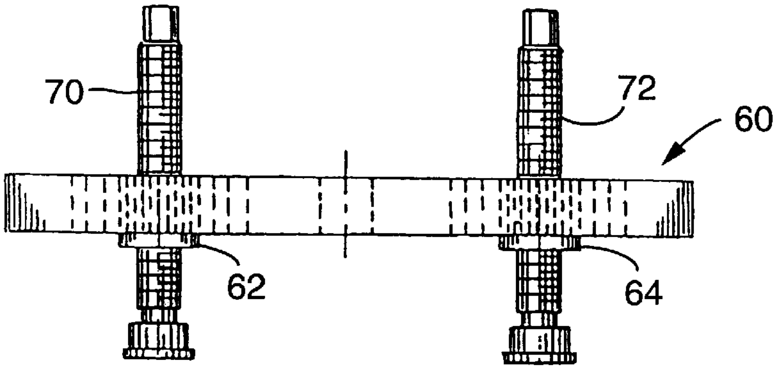

METHOD AND APPARATUS FOR PULLING BUSHINGS AND BEARINGS

BACKGROUND OF THE INVENTION

1. Field of the Invention

The present invention relates generally to a new and improved method and apparatus for pulling bushings or bearings. More specifically the present invention provides a method and apparatus for pulling bushings or bearings quickly and easily from a hole wherein the bushing or bearing is tightly positioned within the hole and requires special tools and/or methods for removing the bushing or bearing from the hole, particularly when the bushing or bearing is situated in a blind hole. For reference purposes, the term bushing will be used synonymously with the term bearing since the method and apparatus of the present invention applies to the removal of both bushings and bearings similarly situated.

2. Description of the Prior Art

Various types of bushings and bearings can be frequently mounted in situations where the bushing can only be accessed from one side, this is commonly known as a blind hole. Often times, as in the case of a standard bushing used for a tree spade, there is no space left behind the bushing in order to leverage a damaged bushing from the hole. Furthermore, conventional type bushing pullers, even blind hole bushing pullers cannot pull bushing from a blind hole if there is no gap present behind the bushing, or if there is no bushing mount so as to grab the bushing with standard type bushing pullers.

The conventional method of removing a bushing that is press fit into a blind hole would be to cut off the back end or grease cap of the blind hole with a torch. After the back end of the blind hole is cut off, then the damaged bushing is then carefully cut lengthwise with a torch, while at the same time being careful so as to not damage the bushing boss supporting the bushing. The damaged bushing can then be forced out from the back end with a tool and/or a hammer. After the bushing is removed, the lining within the bushing boss would need to be inspected for damage and properly cleaned before a new bushing can be inserted. Furthermore, the grease cap or the back end of the blind hole would need to be welded back on and a new bushing can then be inserted.

The entire procedure of removing the damaged bushing using this conventional method can take approximately 30 minutes to an hour for each damaged bushing. This can place a machine that uses multiple bushings out of service for a few days. We have therefore provided a bushing removal tool and method that can remove damaged bushings quickly and easily in about five minutes without a concern of causing any other damage to the bushing boss supporting the bushing.

There have been various types of bushing and bearing pullers available in the marketplace, but none have gained widespread acceptance because of their difficulty of use and the inability for quickly and easily removing bushing or bearings, particularly from a blind hole. In addition, other types of bushing pullers require additional time to remove the bushing/bearing, do not provide flexibility and ease of use of our puller and do not employ the particular method that we have developed in removing bushings and bearings from a bushing boss or a hole, especially when the bushing/bearing is situated in a blind hole.

These and other types of pullers used in the past do not offer the flexibility and inventive features of our method and apparatus for pulling bushings and bearings. As will be described in greater detail hereinafter, the method and apparatus of the present invention differs from those previously proposed.

SUMMARY OF THE INVENTION

According to our present invention we have provided a blind hole bushing puller comprising a drawing portion comprising: a rectangular cross block having a first end-portion and a second end portion and a pair of elongated leg screws a securement portion comprising, a circular bushing insert, and a connection portion comprising a bolt with a matching washer and a nut. Each of the end-portions of the cross block have a threaded leg hole formed therethrough, the cross block also has a centrally located unthreaded cross block hole. One of the leg screws passes through one of the threaded leg holes, and the other leg screw passes through the other threaded leg hole. The bushing insert has a centrally located unthreaded bushing insert hole and is sized to snugly fit about an inside diameter of the bushing. The bolt is sized to pass through the bushing insert hole and the cross block hole with a head of the bolt being positioned adjacent an upper portion of the bushing insert. The bolt head is sized slightly larger than the bushing insert hole and has a sufficient length so as to allow a lower portion of the bolt to extend beyond a lower end of the cross block hole. The bolt is securable to the cross block by the washer and the nut. Whereby when the bushing insert is securely attached within the bushing and the bolt is secured through the bushing insert and the cross block, the leg screws can be tightened in a direction wherein an upper portion of the leg screws comes into engagement with a housing portion supporting the bushing. The leg screws can then be further tightened in an alternating fashion thereby pulling and eventually removing the bushing from the hole.

We have further provided a blind hole bushing puller as described above, wherein each of the leg screws has a hexagonal head at a lower end thereof, wherein the leg screws can be tightened by engaging the hexagonal heads.

Still another feature of our invention concerns the blind hole bushing puller as described above, wherein each of the leg screws has a leg end pivotally positioned at an upper end thereof, the leg ends having a flat upper surface for engagement with a housing portion supporting a bushing that is to be removed.

Still yet another feature of our invention concerns the blind hole bushing puller as described above, wherein the bushing insert includes a key stock securely attached at an upper surface thereof, the key stock being positioned on the bushing insert in such a location so as to prohibit the bolt head from turning when the bolt has been inserted all the way through the bushing insert, thereby allowing a user to securely tighten the bolt to the cross block.

Yet another feature of our invention concerns the blind hole bushing puller as described above, wherein the distance between the pair of elongated leg screws is adjustable so as to provide for the removal of various sized bushings.

A still further feature of our invention concerns the method for pulling a bushing from a blind hole comprising the steps of: a) providing a bushing puller of the type described above; b) placing the bolt through the bushing insert hole of the bushing insert; c) securely attaching the bushing insert within the bushing with the bolt head being positioned within the bushing and a lower portion of the bolt extending outside of the bushing; d) attaching the cross block to the lower portion of the bolt by passing the lower portion of the bolt through the centrally located unthreaded hole in the cross block and securing the cross block to the bolt by placing the washer and the nut onto the bolt; e) tightening the leg screws in a direction wherein an upper portion of the leg screws comes into engagement with a housing portion supporting the bushing; and f) further tighten the leg screws in an alternating fashion to pull and remove the bushing from the blind hole.

An even further feature of our invention concerns the method described above, wherein the bushing insert is securely attached within the bushing by welding the bushing insert to the bushing.

Other objects, features and advantages of our invention will become more readily apparent upon reference to the following description when taken in conjunction with the accompanying drawings, which drawings illustrate several embodiments of my invention.

DESCRIPTION OF THE DRAWINGS

FIG. 2 is a cross-sectional side view of our bushing puller prepared to pull a bushing from a bushing boss or a hole;

FIG. 3 is a top plan view of the bushing puller insert used in our invention;

FIG. 4 is a side view of our bushing puller insert shown in FIG. 3;

FIG. 9 is an exploded perspective view of another embodiment of our bushing puller illustrating further important features of our invention wherein our bushing puller is adjustable for pulling bushings of varying sizes; and FIG. 10 is a side view of our bushing puller shown in FIG. 9.

DETAILED DESCRIPTION OF THE PREFERRED EMBODIMENT

Figure 1:
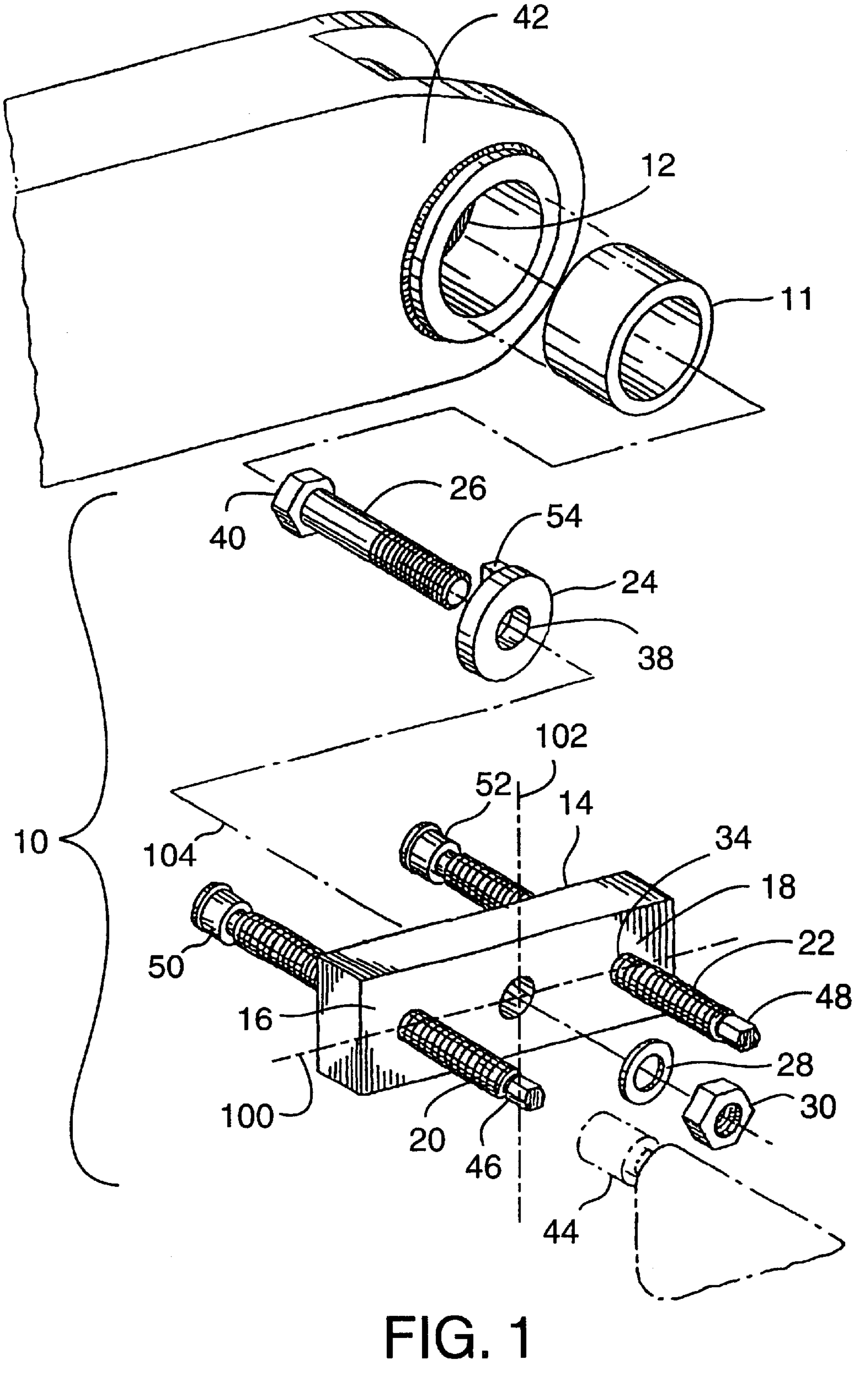
FIG. 1 is an exploded perspective view of our bushing puller embodying important features of our invention.

Referring now to the drawings, FIGS. 1 and 2 show our bushing/bearing puller 10 used for pulling a bushing 11 and/or a bearing from a blind hole 12. Our bushing puller 10 comprising: a rectangular cross block 14 having a first end-portion 16 and a second end portion 18, a pair of elongated leg screws 20, 22, a circular bushing insert 24, and a bolt 26 with a matching washer 28 and a nut 30.

Each of the end-portions 16, 18 of the cross block 14 have a threaded leg hole 32, 34 formed therethrough, and a centrally located unthreaded cross block hole 36 all of which are aligned along a longitudinal axis 100. The cross block 14 can be made of steel, aluminum or any other type of material durable and strong enough to perform the function of pulling a bushing tightly secured within a blind hole.

Each of the leg screws 20, 22 passes through and is threadingly engaged with one of the threaded leg holes 32, 34. The bushing insert 24 has a centrally located unthreaded bushing insert hole 38 and is sized to fit snugly about an inside diameter of the bushing 11. The bolt 26 is sized to pass through the bushing insert hole 38 and the cross block hole 36 with a head 40 of the bolt being positioned adjacent an upper portion of the bushing insert 24.

The bolt head 40 is sized slightly larger than the bushing insert hole 38 and has a sufficient length so as to allow a lower portion of the bolt 26 to extend beyond a lower end of the cross block hole 36. The bolt 26 is securable to the cross block 14 by the washer 28 and the nut 30. When the bushing insert 24 is securely attached within the bushing 11 and the bolt 26 is secured through the bushing insert 24 and the cross block 14, the leg screws 20, 22 can be tightened in a direction wherein an upper portion of the leg screws comes into engagement with a housing portion 42 supporting the bushing 11. The leg screws 20, 22 can then be further tightened in an alternating fashion thereby pulling and eventually removing the bushing 11 from the hole 12.

In order to pull a 2½ inch bushing from a blind hole, excellent results can be obtained when: the cross block 14 is made of steel being one inch thick, two inches wide and six inches long, the threaded leg holes have a 9/16 inch diameter with a 5/8 inch thread (18 threads per inch), and the unthreaded cross block hole has a 9/16 inch diameter; and the bushing insert 24 is ½ inch thick with a 9/16 inch center hole, and the diameter is sized to be approximately 0.002 inches less than the inner diameter of the bushing, with a tolerance of +/−0.001 inches.

In order to make it easy to tighten the leg screws 20, 22 with a high impact wrench 44 or a standard wrench, we have provided hexagonal heads 46, 48 on the ends of the leg screws. We have also provided leg ends 50, 52 that are pivotally positioned at an upper end of the leg screws 20, 22. The leg ends 50, 52 are designed to have a flat upper surface for engagement with the housing portion 42 supporting the bushing 11 that is to be removed from the blind hole 12.

Figure 5:
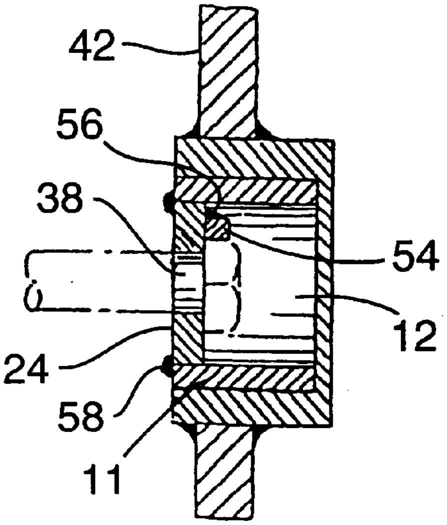
FIG. 5 is a partial cross-sectional side view illustrating the positioning of our bushing puller insert within a bushing that is to be pulled from a hole.

In order to tightly secure the bolt 26 through the bushing insert 24 and the cross block 14, we have alternatively added key stock 54 (FIGS. 3–5) that is securely attached at an upper surface of the bushing insert 24. The key stock 54 can be secured in place with a weld 56. The key stock 54 is positioned on the bushing insert 24 in such a way so as to prohibit the bolt head 40 from turning when the bolt 26 has been inserted all the way through the bushing insert 24, thereby allowing a user to securely tighten the bolt 26 to the cross block 14, thereby keeping the bolt from unnecessarily rotating as one is trying to tighten the bolt 26 down.

Figure 6:
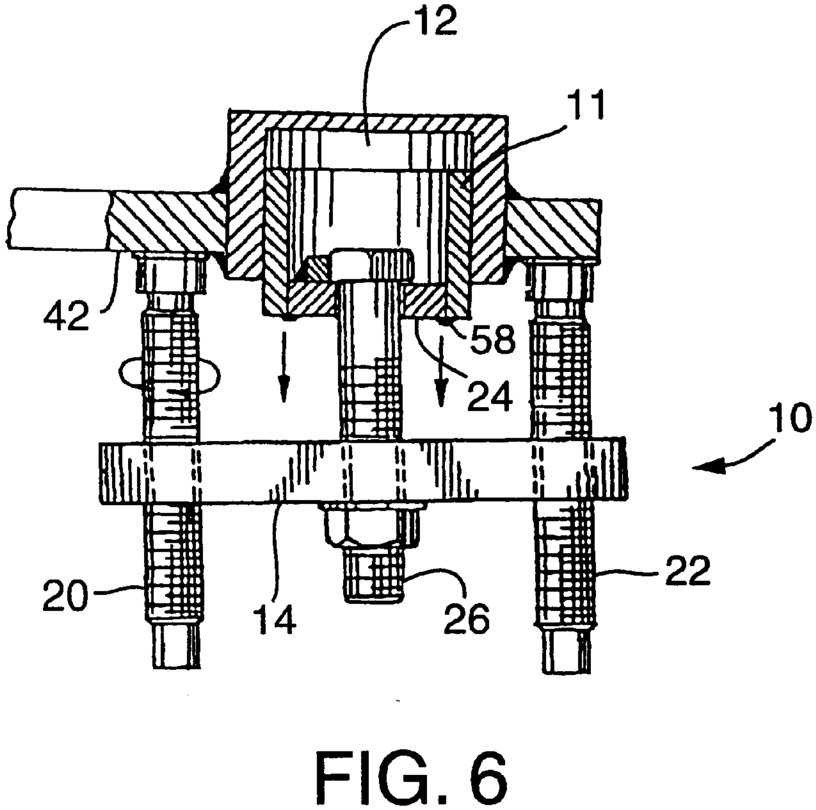
FIG. 6 is a cross-sectional side view illustrating our method of pulling a bushing from a hole using our bushing puller.
Figure 7:
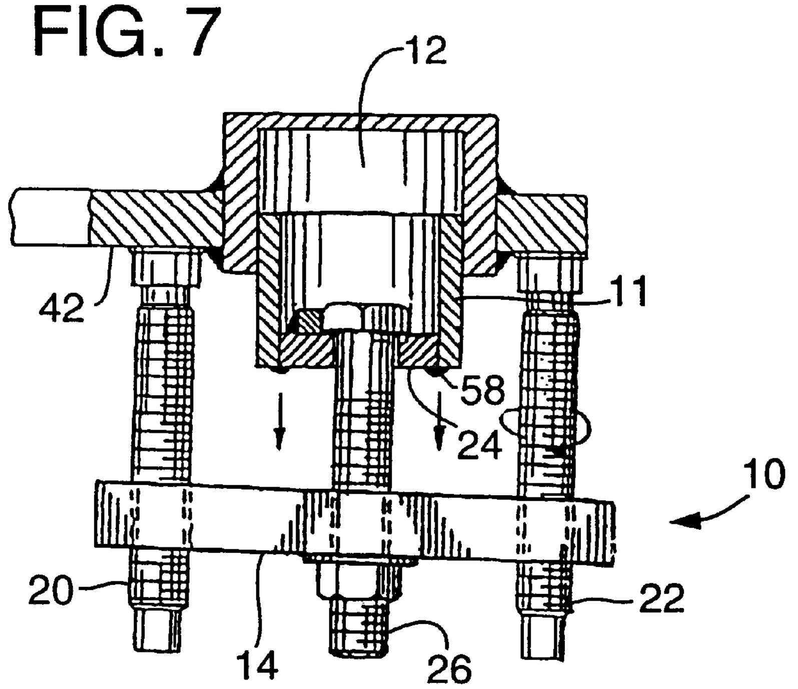
FIG. 7 is a cross-sectional side view further illustrating our method of pulling a bushing from a hole using our bushing puller.
Figure 8:
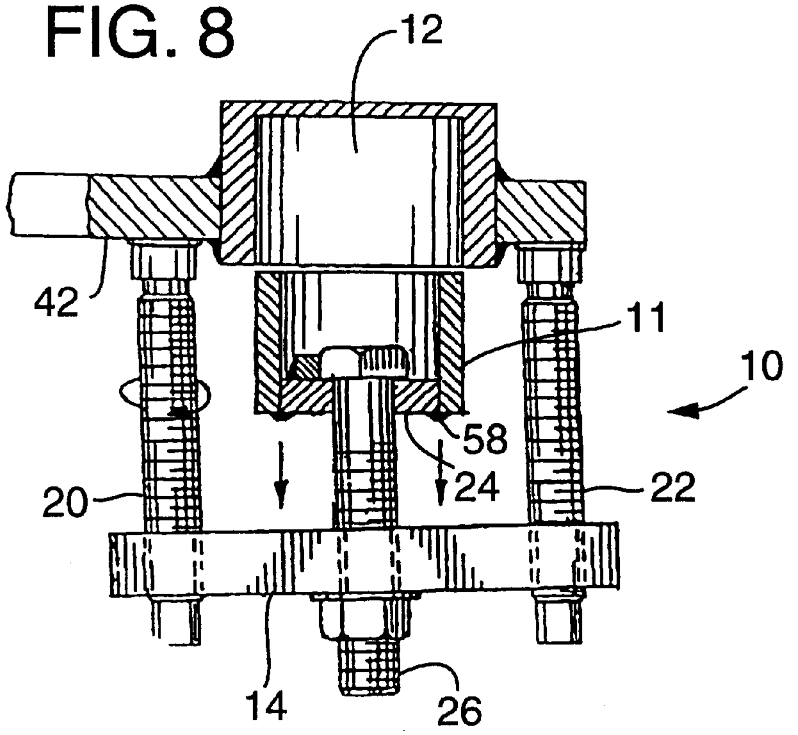
FIG. 8 is a cross-sectional side view illustrating how a bushing is finally removed from a hole using our bushing puller and method.

FIGS. 6–8 illustrate our method of using our bushing puller 10 for pulling a worn bushing 11 from a socket or a blind hole 12 on a tree spade. First a threaded bolt 26 is extended through the bushing insert 24. Then the bushing insert 24 is welded 58 to the bushing insert. A bushing removal tool 10 is then secured to the bolt. Alternative forces are then applied, first to the tree spade 42 at one side of the worn bushing 11 and then another force to a second and opposite side of the worn bushing 11. This process of applying alternating forces is repeated to rock the cross block 14 about a first transverse axis 102 that is perpendicular to the longitudinal axis 100 and simultaneously translate the cross block 14 linearly along a second transverse axis 104 that is mutually perpendicular with the longitudinal axis 100 and first transverse axis 102 until the worn bushing 11 is displaced from the tree spade socket 12. A new bushing can then be inserted into the tree spade socket to complete the reconditioning of the tree spade.

More specifically, FIGS. 6–8 illustrate how the bushing 11 is walked out when the leg screws 20, 22 are tightened in an alternating fashion to pull and remove the bushing 11 from the blind hole 12. FIG. 6 shows how the bushing 11 is slightly pulled from the blind hole 12 and the cross block 14 is slightly angled in relationship to the housing 42 supporting the bushing 11 as the leg screw 20 is tightened. FIG. 7 shows the next step how the bushing 11 is pulled even more from the blind hole 12, and the cross block 14 is now slightly angled the other way in relationship to the housing 42 as the leg screw 22 is tightened. FIG. 8 finally shows how the bushing 11 is finally removed from the blind hole 12 as the leg screws 20, 22 have been tightened in a continuous alternating fashion so as to "walk out" the bushing 11 from the blind hole 12.

Excellent results can be obtained when the bushing insert 24 is securely attached within the bushing 11 by welding 58 the bushing insert 24 directly to the bushing 11. It is generally common for facilities or businesses that perform repairs on equipment that requires a replacement of press fit bushings to have a welding gun readily available for use.

We have also provided a modified version of our bushing puller in order to accommodate the removal of bushings of various sizes. As can be seen in FIGS. 9 and 10, this bushing puller 60 has adjustable leg hole inserts 62, 64 that are sized to engage a widened ridged hole 66, 68 so as to allow for adjustment of the spread of the leg screws 70, 72.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

What is claimed is:

1. A blind hole bushing puller comprising:

a rectangular cross block having a first end-portion and a second end portion, each of said end-portions having a threaded leg hole formed therethrough, said cross block also having a centrally located unthreaded cross block hole;

a pair of elongated leg screws, one of said leg screws passing through and being threadingly engaged within one of the threaded leg holes, and the other said leg screw passing through and being threadingly engaged within the other threaded leg hole;

a circular bushing insert, said bushing insert having a centrally located unthreaded bushing insert hole, said bushing insert being sized to snugly fit about an inside diameter of a bushing that is to be removed from a hole;

a bolt, a washer, and a nut, said bolt having a bolt head at an upper end thereof, said bolt being sized to pass through the bushing insert hole and the cross block hole with the bolt head being positioned adjacent an upper portion of the bushing insert, said bolt head being sized slightly larger than the bushing insert hole so as to not allow the bolt head to pass through the bushing insert hole, said bolt having a sufficient length so as to allow a lower portion of the bolt to extend beyond a lower end of the cross block hole, said bolt being securable by said washer and said nut threadingly engageable on the lower portion of the bolt adjacent the cross block, said washer being sized slightly larger than the cross block hole so as to not allow the washer and the nut to pass through the cross block hole;

whereby when said bushing insert is securely attached within a bushing secured within a hole and said bolt is secured through the bushing insert and the cross block, said leg screws can be tightened in a direction wherein an upper portion of the leg screws comes into engagement with a housing portion supporting the bushing, said leg screws can then be further tightened in an alternating fashion thereby pulling and eventually removing the bushing from the hole.

2. The blind hole bushing puller of claim 1, wherein each of the leg screws has a hexagonal head at a lower end thereof, wherein said leg screws can be tightened by engaging the hexagonal heads.

3. The blind hole bushing puller of claim 1, wherein each of the leg screws has a leg end pivotally positioned at an upper end thereof, said leg ends having a flat upper surface for engagement with a housing portion supporting a bushing that is to be removed.

4. The blind hole bushing puller of claim 1, wherein said bushing insert includes a key stock securely attached at an upper surface thereof, said key stock being positioned on the bushing insert in such a location so as to prohibit the bolt head from turning when the bolt has been inserted all the way through the bushing insert, thereby allowing a user to securely tighten the bolt to the cross block.

5. The blind hole bushing puller of claim 1, wherein the distance between the pair of elongated leg screws is adjustable so as to provide for the removal of various sized bushings.

6. In combination a bushing puller and a bushing positioned within a blind hole, said bushing puller comprising:

a rectangular cross block having a first end-portion and a second end portion, each of said end-portions having a threaded leg hole formed therethrough, said cross block also having a centrally located unthreaded cross block hole;

a pair of elongated leg screws, one of said leg screws passing through and being threadingly engaged within one of the threaded leg holes, and the other said leg screw passing through and being threadingly engaged within the other threaded leg hole;

a circular bushing insert, said bushing insert having a centrally located unthreaded bushing insert hole, said bushing insert being sized to snugly fit about an inside diameter of a bushing that is to be removed from a hole;

a bolt, a washer, and a nut, said bolt having a bolt head at an upper end thereof, said bolt being sized to pass through the bushing insert hole and the cross block hole with the bolt head being positioned adjacent an upper portion of the bushing insert, said bolt head being sized slightly larger than the bushing insert hole so as to not allow the bolt head to pass through the bushing insert hole, said bolt having a sufficient length so as to allow a lower portion of the bolt to extend beyond a lower end of the cross block hole, said bolt being securable by said washer and said nut threadingly engageable on the lower portion of the bolt adjacent the cross block, said washer being sized slightly larger than the cross block hole so as to not allow the washer and the nut to pass through the cross block hole;

whereby when said bushing insert is securely attached within a bushing secured within a hole and said bolt is secured through the bushing insert and the cross block, said leg screws can be tightened in a direction wherein an upper portion of the leg screws comes into engagement with a housing portion supporting the bushing, said leg screws can then be further tightened in an alternating fashion thereby pulling and eventually removing the bushing from the hole.

7. The combination of claim 6, wherein each of the leg screws has a hexagonal head at a lower end thereof, wherein said leg screws can be tightened by engaging the hexagonal heads.

8. The combination of claim 6, wherein each of the leg screws has a leg end pivotally positioned at an upper end thereof, said leg ends having a flat upper surface for engagement with a housing portion supporting a bushing that is to be removed.

9. The combination of claim 6, wherein said bushing insert includes a key stock securely attached at an upper surface thereof, said key stock being positioned on the bushing insert in such a location so as to prohibit the bolt head from turning when the bolt has been inserted all the way through the bushing insert, thereby allowing a user to securely tighten the bolt to the cross block.

10. The combination of claim 6, wherein the distance between the pair of elongated leg screws is adjustable so as to provide for the removal of various sized bushings.

11. A method for pulling a bushing from a blind hole comprising the steps of:

a) providing a bushing puller comprising: a rectangular cross block having a first end-portion and a second end portion, each of the end-portions having a threaded leg hole formed therethrough, the cross block also having a centrally located unthreaded cross block hole; a pair of elongated leg screws, one of the leg screws passing through and being threadingly engaged within one of the threaded leg holes, and the other leg screw passing through and being threadingly engaged within the other threaded leg hole; a circular bushing insert, the bushing insert having a centrally located unthreaded bushing insert hole, the bushing insert being sized to snugly fit about an inside diameter of the bushing that is to be removed from the blind hole; a bolt having a bolt head at an upper end thereof, the bolt being sized to pass through the bushing insert hole and the cross block hole, the bolt head being sized slightly larger than the bushing insert hole so as to not allow the bolt head to pass through the bushing insert hole; a washer sized to fit onto the bolt; and a nut sized for threaded engagement with the bolt;

b) placing the bolt through the bushing insert hole of the bushing insert;

c) securely attaching the bushing insert within the bushing with the bolt head being positioned within the bushing and a lower portion of the bolt extending outside of the bushing;

d) attaching the cross block to the lower portion of the bolt by passing the lower portion of the bolt through the centrally located unthreaded hole in the cross block and securing the cross block to the bolt by placing the washer and the nut onto the bolt;

e) tightening the leg screws in a direction wherein an upper portion of the leg screws comes into engagement with a housing portion supporting the bushing; and f) further tighten the leg screws in an alternating fashion, thereby pulling and removing the bushing from the blind hole.

12. The method of claim 11, wherein the bushing insert is securely attached within the bushing by welding the bushing insert to the bushing.

13. A puller comprising:

a rectangular cross block having a first end-portion and a second end portion, each of said end-portions having a threaded leg hole formed therethrough, said cross block also having a centrally located unthreaded cross block hole;

a pair of elongated leg screws, one of said leg screws passing through and being threadingly engaged within one of the threaded leg holes, and the other said leg screw passing through and being threadingly engaged within the other threaded leg hole;

a circular insert, said insert having a centrally located unthreaded insert hole, said insert being sized to snugly fit about a diameter of a member that is to be removed from a hole;

a bolt, a washer and a nut, said bolt being sized to extend through the insert hole and the cross block hole with the bolt head being positioned adjacent an upper portion of the insert, said bolt head being sized slightly larger than the insert hole so as to not allow the bolt head to pass through the insert hole, said bolt having a sufficient length so as to allow a lower portion of the bolt to extend beyond a lower end of the cross block hole, said bolt being securable by said washer and said nut threadingly engageable on the lower portion of the bolt adjacent the cross block, said washer being sized slightly larger than the cross block hole so as to not allow the washer and the nut to pass through the cross block hole;

whereby when said insert is securely attached within a member secured within a hole and said bolt is secured through the insert and the cross block, said leg screws can be tightened in a direction wherein an upper portion of the leg screws comes into engagement with a housing portion supporting the member, said leg screws can then be further tightened in an alternating fashion thereby pulling and eventually removing the member from the hole.

14. A pulling device for displacing a bushing from a blind hole, the pulling device comprising a drawing portion, a securement portion, and a connection portion which connects the drawing portion to the securement portion, wherein the drawing portion comprises an elongate block having a first end, a second end and a mid portion which extends between said first end and said second end, the block having a longitudinal axis which lies such that it intersects the first end, the midportion, and the second end, the drawing portion further comprising a two spaced apart leg screw engaging two respective threads through holes of the elongate block, whereby when each leg screw is rotated in alternating fashion, the block is caused to rock about a first transverse axis which is perpendicular to said longitudinal axis, and when each leg screw is rotated the block is also caused to translate along a second transverse axis which is perpendicular to both said longitudinal axis and said first transverse axis, the connection portion comprising an elongate rigid threaded member, the connection portion having a first end and a second end, the second end being opposed to the first end, the connection portion extends from the block such that connection portion lies in parallel to the second transverse axis and the second end of the connection portion is spaced apart from the block, the securement portion being secured to said second end of connection portion, the securement portion adapted to secure the pulling device to the bushing, wherein when each leg screw is rotated in alternating fashion, the connection portion and securement portion are drawn in parallel motion with the block such that said translations and rocking motions of the block are transferred to and experienced by said securement portion.

15. The pulling device of claim 14 wherein said block comprises a first surface and a second surface, the first surface being opposed to said second surface, and wherein said block further comprises a centrally located unthreaded through hole which extends between said first surface and said second surface, said centrally located unthreaded through hole sized to receive said first end of said connection portion therethrough, said connection portion residing within said centrally located unthreaded through hole of said block, said first end of said connection portion being prevented from withdrawing out of said centrally located unthreaded through hole of the block by securing a nut to said first end of said connection portion, wherein the drawing device is aligned along the second transverse axis such that the elongate rigid threaded member of the connection portion is coaxial with the second transverse axis and the block centrally located unthreaded through hole is centered on the second transverse axis.

16. The pulling device of claim 15, wherein a first end of each of the leg screws terminates in a foot portion, each respective foot portion having a flat end surface for engagement with a housing portion supporting a bushing that is to be removed, each respective foot portion being pivotable to accommodate the rocking of the elongate block.

17. The pulling device of claim 15, wherein the distance between the pair of elongated leg screws is adjustable such that the distance between said respective leg screws is changed without removing said leg screws from said block, said adjustability provided so as to allow for the removal of various sized bushings.

* * * * *